(12) United States Patent
Lundgren

(10) Patent No.: US 7,100,982 B2
(45) Date of Patent: Sep. 5, 2006

(54) VERSATILE SHOPPING CART SEAT COVER

(76) Inventor: Mia F. Lundgren, 4932 Mt. Hay Dr., San Diego, CA (US) 92117

( * ) Notice: Subject to any disclaimer, the term of this patent is extended or adjusted under 35 U.S.C. 154(b) by 0 days.

(21) Appl. No.: 11/175,624

(22) Filed: Jul. 5, 2005

(65) Prior Publication Data

US 2006/0103201 A1    May 18, 2006

Related U.S. Application Data

(60) Provisional application No. 60/590,301, filed on Jul. 22, 2004.

(51) Int. Cl.
*A47D 1/10* (2006.01)

(52) U.S. Cl. .......................... 297/256.17; 297/219.12; 297/228.11; 280/33.992

(58) Field of Classification Search ........... 297/256.17, 297/219.12, 228.11; 280/33.992
See application file for complete search history.

(56) References Cited

U.S. PATENT DOCUMENTS

| | | | |
|---|---|---|---|
| 4,204,695 A | 5/1980 | Salzman | 280/33.99 |
| 4,324,430 A | 4/1982 | Dimas | 297/250 |
| D289,123 S | 4/1987 | Tennen | D6/596 |
| 4,655,502 A | 4/1987 | Houllis | 297/229 |
| 4,666,207 A | 5/1987 | Quartano | 297/229 |
| 4,674,758 A | 6/1987 | Valley et al. | 280/33.99 |
| 4,805,937 A | 2/1989 | Boucher et al. | 280/33.992 |
| 4,863,003 A | 9/1989 | Carter | 190/8 |
| D308,614 S | 6/1990 | Gordon | D6/611 |
| 5,330,250 A | 7/1994 | Reyes | 297/229 |
| 5,547,250 A | 8/1996 | Childers | 297/256.17 |
| D380,118 S | 6/1997 | Ford | D6/601 |
| 5,702,114 A | 12/1997 | Downing et al. | 280/47.23 |
| 5,715,571 A | 2/1998 | Fasano | 16/110 |
| D392,084 S | 3/1998 | Hanes | D34/27 |
| 5,829,835 A * | 11/1998 | Rogers et al. | 297/256.17 |
| 5,855,412 A | 1/1999 | Smith et al. | 297/256.17 |
| 5,938,336 A | 8/1999 | King | 383/4 |
| 5,961,018 A | 10/1999 | Abelbeck et al. | 224/584 |
| 6,036,264 A * | 3/2000 | Lucree | 297/256.17 |
| 6,129,418 A | 10/2000 | Bergh et al. | 297/256.17 |
| 6,164,721 A | 12/2000 | Latshaw et al. | 297/256.17 |
| 6,206,471 B1 | 3/2001 | McGowan | 297/256.17 |
| 6,224,152 B1 | 5/2001 | Hughes et al. | 297/256.17 |
| 6,237,998 B1 * | 5/2001 | Aprile | 297/219.12 |
| 6,428,098 B1 | 8/2002 | Allbaugh | 297/219.12 |
| 6,491,996 B1 | 12/2002 | Digangi | 428/43 |
| 6,517,155 B1 | 2/2003 | Landine | 297/256.17 |
| D484,665 S | 12/2003 | Richardson | D34/27 |

(Continued)

OTHER PUBLICATIONS http://www/cleanshopper.com/twinscleanshopper.htm.
http://www.covers4kids.com/Double.html.

*Primary Examiner*—Laurie K. Cranmer
(74) *Attorney, Agent, or Firm*—T D Foster; Thomas D. Foster

(57) ABSTRACT

The present invention relates to shopping cart seat covers for comfort and safety of one or two children when seated in the shopping cart. The present invention is particularly adaptable for providing a safe area for seating one or two children inside the extending platform of shopping carts. The present invention can be used in conjunction with any shopping cart that has a pivoting or extending platform, including large shopping carts, which are designed/made to seat two children, or smaller shopping carts, which are designed/made to seat only one child.

14 Claims, 5 Drawing Sheets

U.S. PATENT DOCUMENTS

| | | | |
|---|---|---|---|
| 6,655,734 B1 | 12/2003 | Hunter et al. | 297/219.1 |
| 6,669,289 B1 * | 12/2003 | Hays | 297/265.17 |
| 6,702,381 B1 * | 3/2004 | Endicott et al. | 297/256.17 |
| D492,830 S * | 7/2004 | Rogers | D34/27 |
| 6,902,087 B1 * | 6/2005 | Hancock et al. | 224/401 |
| 2003/0205601 A1 * | 11/2003 | Kilduff | 224/627 |

* cited by examiner

VERSATILE SHOPPING CART SEAT COVER

RELATED DOCUMENTS

The present application claims benefit of priority to U.S. Provisional Application No. 60/590,301, filed Jul. 22, 2004, entitled Shopping Cart Seat Cover, which is incorporated by reference herein in its entirety.

FIELD OF INVENTION

The present invention relates generally to the field of shopping cart covers, and particularly to shopping cart seat covers for comfort and safety of one or two children when seated in the shopping cart.

BACKGROUND OF THE INVENTION

Many supermarkets and department stores provide their customers with conventional shopping carts of various sizes. Many of these shopping carts include a pivoting or extending child seat structure, which can be extended to provide a platform where a child may be seated. A variety of shopping cart seat covers for holding small children in place inside the platform of the shopping carts are commercially available. These shopping cart seat covers can be used for a variety of purposes, such as for example, comfort, safety, and restraint of children inside the shopping carts.

Although these commercial shopping cart seat covers are available, many are ineffective and inefficient when it comes to comfort and safety of children. Currently all cart covers on the market only seat one child, making it difficult for mothers of twins and or multiple children to provide comfort, protection, and safety for both children. These shopping cart seat covers are often difficult to transport and carry from home to the shopping destination. The design of many of these shopping cart seat covers makes installation time consuming and difficult, especially while handling a child at the same time. While there has been a trend to produce more effective and user friendly shopping cart seat covers, further improvements for ease of use and transportation, offering adaptability to accommodate more than one child, effectiveness, and safety of these shopping cart seat covers are desirable, and the present invention addresses the existing problems and provides related benefits.

SUMMARY OF THE INVENTION

The present invention relates generally to the field of shopping cart covers, and particularly to shopping cart seat covers for comfort and safety of one or two children when seated in the shopping cart. The present invention is particularly adaptable for providing a safe area for seating one or two children inside the extending platform of shopping carts. The present invention can be used in conjunction with any shopping cart that has a pivoting or extending platform, including large shopping carts, which are designed/made to seat two children, or smaller shopping carts, which are designed/made to seat only one child. The present invention provides a shopping cart seat cover that envelops around all sides of the pivoting platform of the shopping cart providing a comfortable place for seating children while at the same time eliminating any direct contact between the children and the shopping cart. The present invention recognizes that shopping cart seat covers can be adapted to seat one or two children and can be made more safe and comfortable by restraining one or two children in place inside the extending platform of shopping carts.

One aspect of the present invention includes a shopping cart seat cover that can be removably placed inside the extendable platform of a shopping cart for seating one or two children, including a substantially planar padded material having a peripheral edge, which when placed inside the extendable platform of the shopping cart, forms a seat capable of seating one or two children. When the shopping cart seat cover is placed inside the extendable platform of the shopping cart, the seat which is formed includes a front side, a back side, a bottom side, a right side, and a left side, wherein the peripheral edge of the front side and the peripheral edge of the back side include elastic means for urging the seat into shape and holding the seat in place inside the extendable platform of the shopping cart. The front side of the seat may include four apertures to allow the legs of one or two children to extend out from the seat. The present invention also includes one or more flaps, wherein each of the flaps may be fixedly attached to one side of each of the apertures, which flaps are capable of providing a removable cover for the aperture. The present invention also includes one or more seat belts for securing one or two children inside the seat. The present invention also includes one or more safety clasps or fasteners for removable attachment of the seat to the shopping cart. The present invention may also include a container having an open end and a closed end fixedly attached to the shopping cart seat cover, which is capable of containing the shopping cart seat cover within itself when the shopping cart seat cover is in a folded configuration. The container may optionally include a strap-like element fixedly attached at each end to the container for ease of carrying, and also optionally the open end of the container may include a Velcro® means for closure or optionally include a drawstring means for closure.

DETAILED DESCRIPTION OF THE INVENTION

Introduction

Figure 1:
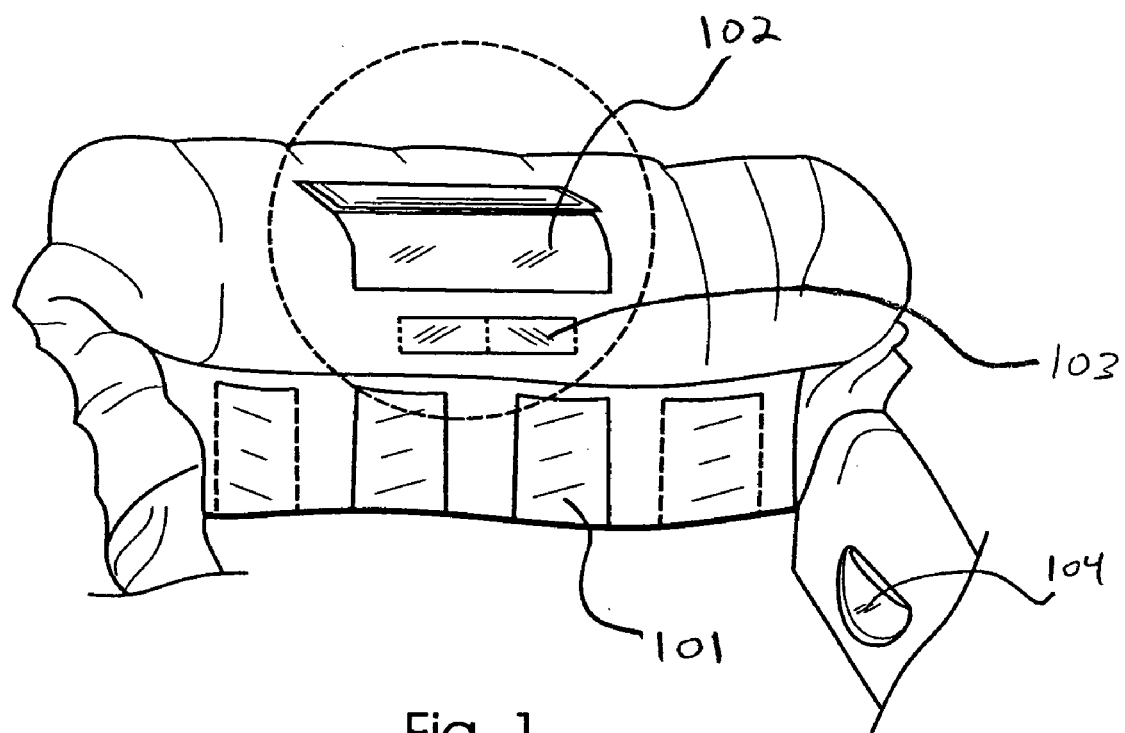
FIG. 1 shows a view of an embodiment of the present invention including four apertures 101 for allowing the legs of two children to extend from the seat, a hidden pocket 102, double toy loop 103, and an inside pocket 104.
Figure 1A:
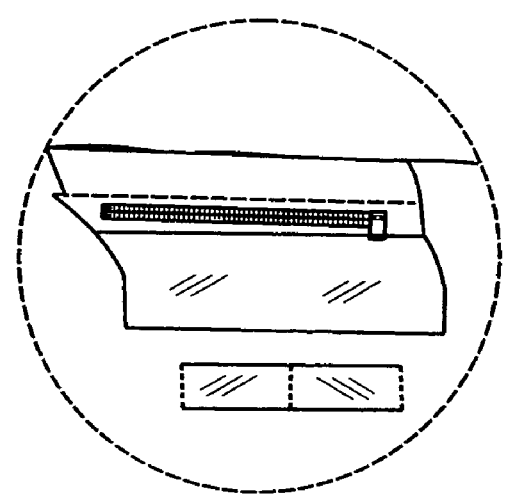
Figure 2:
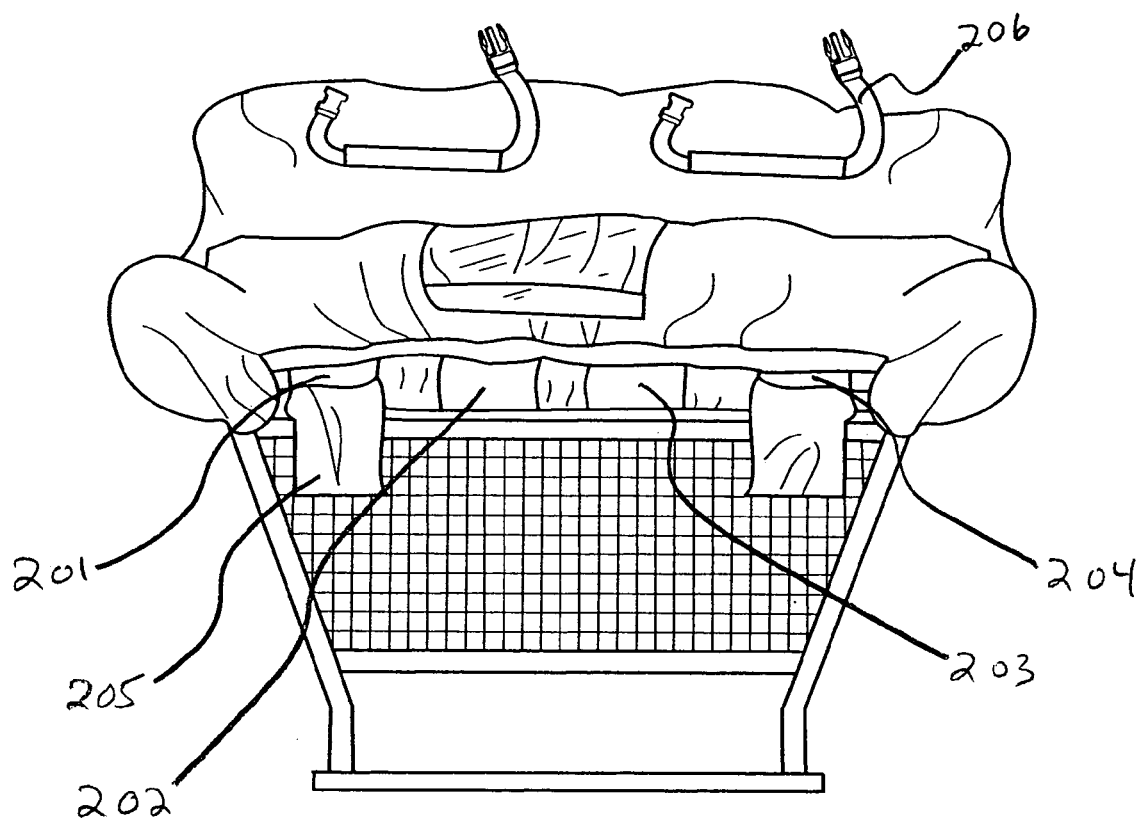
FIG. 2 shows a view of an embodiment of the present invention including four apertures at a first 201, a second 202, a third 203, and a fourth 204 positions, with the apertures at the first 201 and fourth 204 positions including a flap 205 capable of sealingly covering the apertures, and two seat belts 206 for securing one or two children inside the seat.
Figure 3:
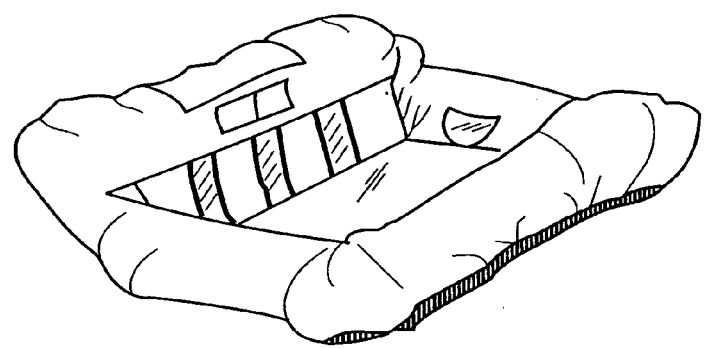
FIG. 3 shows a perspective view of an embodiment of the present invention.
Figure 4:
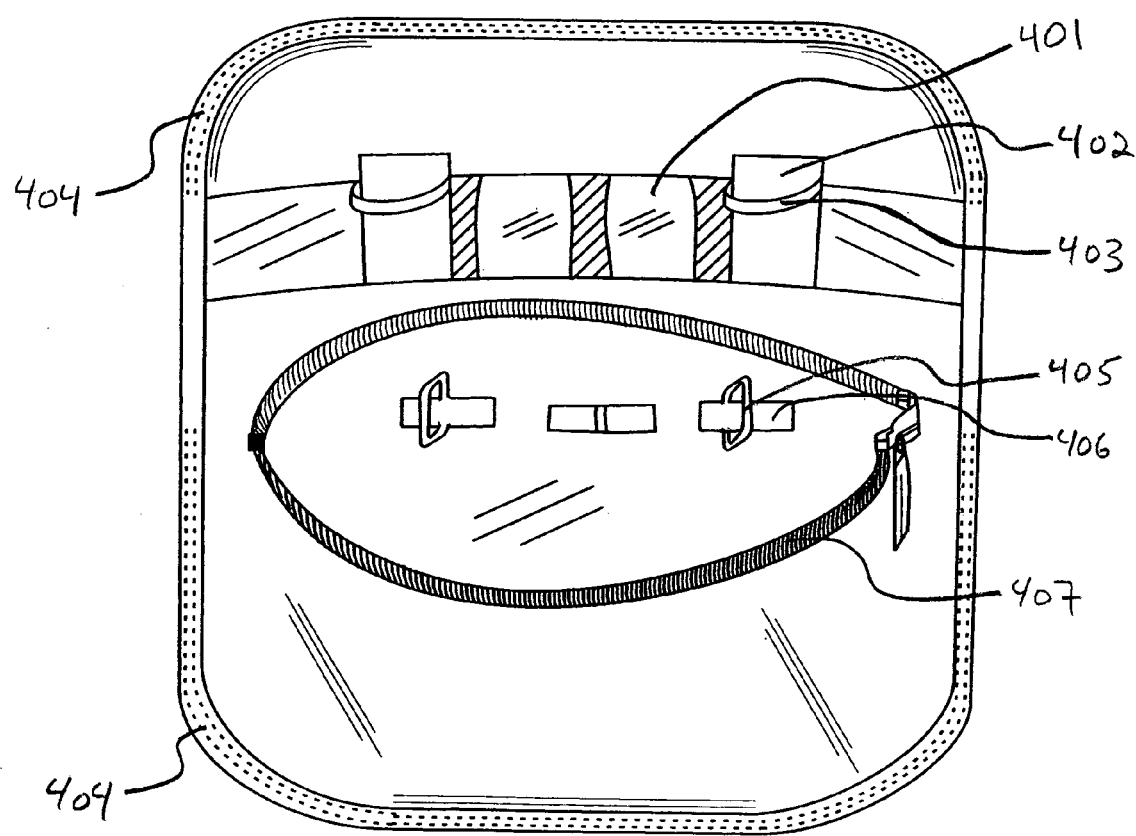
FIG. 4 shows a flattened bottom view of an embodiment of the present invention including apertures 401 with flaps 402 which are slightly longer than the apertures, a strap 403 for simultaneous zipping up of both sides of the flap, elastic means 404 for urging the seat into shape and holding the seat in place at the peripheral edges of the front side and the back side of the seat, safety clasps or fasteners 405 attached through the puckers 406 of the seat belts for removable attachment of the seat to the shopping cart cover, and zipper closure means 407 attached to the body of the seat wherein when zipped up it creates a tote.
Figure 5:
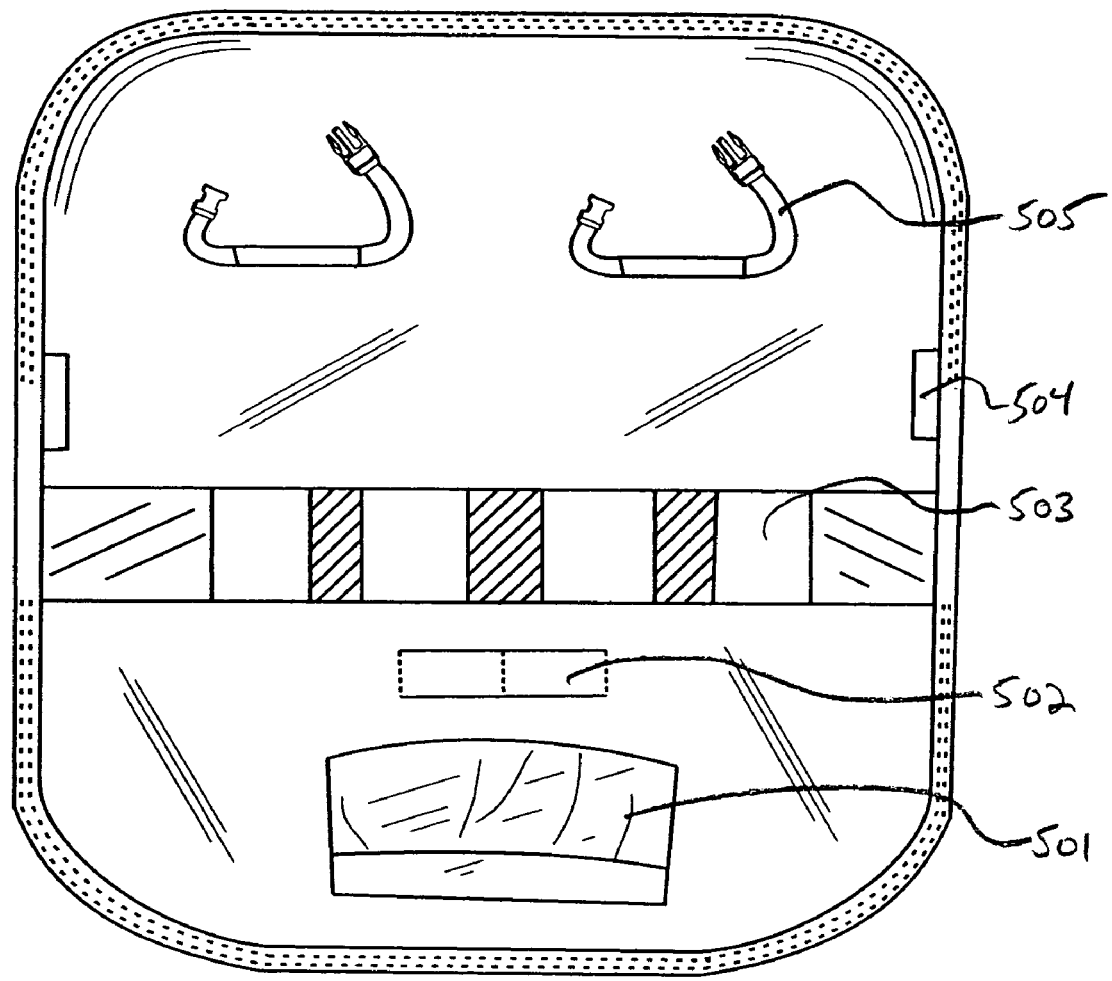
FIG. 5 shows a flattened top view of the present invention including a hidden pocket 501, a double toy loop 502, four apertures 503, two inside pockets 504, and two seat belts 505.
Figure 6A:
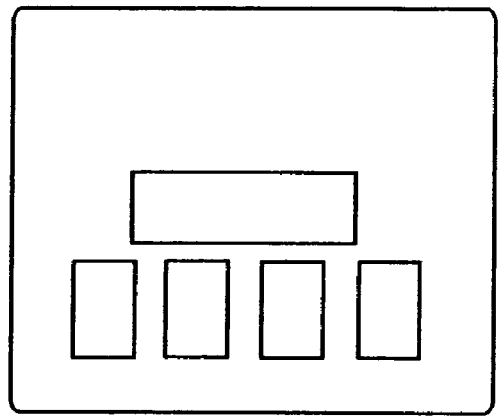
FIG. 6 shows a flattened bottom view of an embodiment of the present invention FIG. 6A, a flattened top view of an embodiment of the present invention FIG. 6B, a closed up container with the seat cover inside FIG. 6C.
Figure 6B:
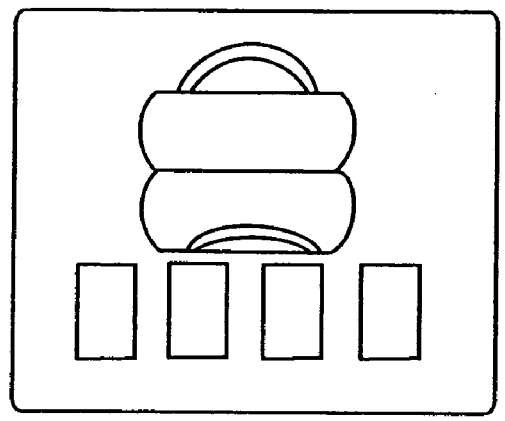
Figure 6C:
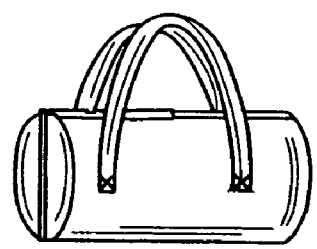

The present invention relates generally to shopping cart covers, and particularly to shopping cart seat covers for comfort and safety of one or two children when seated in the shopping cart.

As a non-limiting introduction to the breadth of the present invention, the present invention includes several general and useful aspects, including:

1. A shopping cart seat cover that can be removably placed inside the extendable platform of a shopping cart for seating one or two children including:

a substantially planar padded material having a peripheral edge, which when placed inside the platform, forms a seat capable of seating one or two children, said seat including a front side, a back side, a bottom side, a right side, and a left side, wherein the peripheral edge of the front side and the peripheral edge of the back side include elastic means for urging the seat into shape and holding the seat in place, the front side having a total of four apertures at a first, a second, a third, and a fourth positions to allow the legs of one or two children to extend out from the seat;

one or more flaps each fixedly attached to one side of each of the apertures and capable of being sealingly covering the apertures;

one or more seat belts for securing one or two children inside the seat;

one or more safety fasteners for removable attachment of the seat to the shopping cart; and a container having an open end and a closed end fixedly attached to the shopping cart seat cover capable of containing the shopping cart seat cover within when the shopping cart seat cover is in a folded configuration, and optionally including a strap fixedly attached at each end to the container for ease of carrying, and also optionally the open end of the container may include a Velcro® closure means or a drawstring closure means.

Further objectives and advantages of the present invention will become apparent as the description proceeds and when taken in conjunction with the accompanying drawings. To gain a full appreciation of the scope of the present invention, it will be further recognized that various aspects of the present invention can be combined to make desirable embodiments of the invention.

Unless defined otherwise, all technical and scientific terms used herein have the same meaning as commonly understood by one of ordinary skill in the art to which this invention belongs. Where a term is provided in the singular, the inventor also contemplates the plural of that term. The nomenclature used herein and the procedures described below are those well known and commonly employed in the art.

I. A Versatile Shopping Cart Seat Cover

The present invention includes a shopping cart seat cover for comfort and safety of one or two children when seated in the extendable platform of a shopping cart. The present invention includes a shopping cart seat cover that can be removably placed inside the extendable platform of a shopping cart for seating one or two children. The present invention can be adapted to fit inside the extendable platform of a shopping cart by expanding and contracting manipulations to cover the entire area of the extendable platform and cover all sides of the extendable platform in order to minimize or eliminate any direct contact by the children with the shopping cart. The present invention is preferably made of multiple parts and components that are attached together, for example by sewing or other suitable attaching means, to form the shopping cart seat cover. The present invention includes a substantially planar padded material, having a peripheral edge, which when placed inside the extendable platform of the shopping cart forms a seat capable of seating one or two children. The substantially planar padded material can be made of any suitable material in order to provide a safe and comfortable seat for one or two children. The substantially planar padded material can be made of natural material, synthetic material, or a combination thereof, such as for example, cotton, and/or polyester, and/or cotton polyester blend. Preferably the substantially padded material can be treated with a flame retardant. By way of example, the substantially planar padded material can include two layers of flat or quilted material having one or more layers of batting in the middle.

When the shopping cart seat cover is placed inside the extendable platform of the shopping cart, the seat which forms includes a front side, a back side, a bottom side, a right side, and a left side, wherein the peripheral edge of the front side and the peripheral edge of the back side include elastic means, such as for example, rubber based elastic fabrics or drawstrings, or other suitable elastic means, for urging the seat into shape and holding the seat in place while inside the extendable platform of the shopping cart. By way of example, the body of the seat cover can have a one inch casing around the entire top edge. The elastic can be placed inside the one inch casing of the peripheral edge of the front side and the peripheral edge of the back side, leaving both the left side and the right side without elastic means. The unique front and back placement of the elastic means allows pulling in opposite direction, making the top edge of the right side and the left side of the seat cover to pull over the cart creating a flap thus fully covering the shopping cart platform.

The front side of the seat may include four apertures at a first, a second, a third, and a fourth positions to allow the legs of one or two children to extend and hang out from the seat while the children are riding in the extendable platform of the shopping cart. The present invention also includes one or more flaps, which may be each fixedly attached to one side of each of the apertures, which are capable of resealingly or detachably closing or covering the apertures, such as for example, by way of one or more buttons, Velcro®, zippers, or other suitable means. The flaps may be substantially the same size as the apertures when they close, however, the top end of the flaps are preferably longer than the length of the apertures when they close. Preferably, the present invention includes two zippers, one on each sides of the first and last flaps in order to close those apertures when only one child is being carried in the seat in the center position with the legs of the child hanging out of the middle two apertures. When two children are being carried inside the seat, the zippers of the first and last apertures may be unzipped to allow two children to sit side by side with their legs hanging out of the four apertures. Preferably the zippers of a flap may be unzipped by way of a connecting member, such as a strap, that unzips both zippers of a flap simultaneously. The flaps may be used to close one or more of the apertures, for example, when only one child is riding in the shopping cart seat cover that has four apertures. When only one child is riding inside the seat, preferably the aperture farthest to the right and the aperture farthest to the left are sealed off to continually provide full coverage of the cart, and such that if there are any items inside the seat, such as for example pacifiers, bottles, or toys, they remain inside and do not fall out of the seat.

The present invention may also include one or more seat belts for securing one or two children inside the seat. By way of example, the seat belts can be looped through the body of the seat, preferably through the back side of the seat cover through button holes. A seat belt configured as such can then be fastened in front of a child for safety and restraint. Preferably, the seat belt configuration is sewn to the body of the cart cover and is adaptable to buckle one child seating in the center of the cart seat or 2 children sitting side by side.

The present invention also includes one or more safety clasps or fasteners for removable attachment of the seat to the shopping cart cover. For example, fasteners or clips such as weight rated Carabiners® may be used to removably attach the seat to the grill-like body of the shopping cart cover. The Carabiner® clip is a rated and tested weight bearing clip which can be used to quickly and efficiently attach the seat cover to the shopping cart, for example, via the back of the seat belt to the seat platform grill of the shopping cart. Preferably, the back side of the seat belt also is sewn to the body of the cart cover with puckers to hold the Carabiner® clips in place and so they can be removed for washing of the cart cover.

The present invention may also include a container, such as for example a pouch or a tote bag, having an open end and a closed end fixedly attached to the shopping cart seat cover capable of containing the shopping cart seat cover within itself when the shopping cart seat cover is in a folded configuration. By way of example, the tote bag can be sewn to the back side of the seat cover where the children will be sitting and their backs will be resting, and by positioning the tote bag as such additional cushioning and comfort can be provided for the children. The placement of the tote is preferably out of sight and reach of the children. When removing the seat cover from the shopping cart, the right side and left side of the seat cover can be folded into the middle and rolled one or more times, and then the seat cover may be picked up and by fully inserting a hand into the tote and by grabbing and invert pulling the cover out, the tote fully envelops the seat cover in its entirety. In a preferred embodiment, the front side and back side of the seat cover can be folded into the middle and zipped closed, creating a tote. The container or bag for holding the folded seat inside can optionally include a strap or other proper handling means fixedly attached at each end to the container for ease of carrying, and also optionally the open end of the container may include a Velcro7 closure means or optionally a drawstring closure means. Preferably the tote is a zipper attached to the body of the cart cover, when zipped up it creates a tote.

The present invention may also include other useful aspects, such as for example, a hidden pocket for placement of a wallet, keys, or mobile phone, and also side pockets on the inside of the seat cover for cup holders or toys.

All headings are for the convenience of the reader and should not be used to limit the meaning of the text that follows the heading, unless so specified. Various changes and departures may be made to the present invention without departing from the spirit and scope thereof. Accordingly, it is not intended that the invention be limited to that specifically described in the specification or as illustrated in the examples, but only as set forth in the claims.

What is claimed is:

1. A shopping cart seat cover that can be removably placed inside the extendable platform of a shopping cart for seating one or two children comprising:
    a substantially planar padded material having a peripheral edge, which when placed inside said extendable platform, forms a seat capable of seating one or two children, comprising a front side, a back side, a bottom side, a right side, and a left side, wherein only said peripheral edge of said front side and said peripheral edge of said back side comprise elastic means for urging said seat cover into shape by pulling said seat cover in opposite direction, making the top edge of said right side and said left side of the seat cover to pull over said extendable platform creating a flap and fully covering said extendable platform and holding said seat cover in place inside said extendable platform, said front side having a total of four apertures at a first, a second, a third and a fourth positions to allow the legs of said one or two children to extend out from said seat;
    one or more flaps each fixedly attached to one side of each of said apertures and capable of resealingly closing said apertures;
    one or more seat belts attached to said seat cover for securing said one or two children inside said seat cover configured to be fastened in front of said one or two children for safety and restraint;
    one or more safety clasps for removable attachment of said seat cover to said shopping cart; and
    a container having an open end and a closed end fixedly attached to said shopping cart seat cover capable of containing said shopping cart seat cover within when said shopping cart seat cover is in a folded configuration.

2. The seat cover of claim 1, wherein said apertures at said first and said forth positions may be closed by said flaps by way of two zippers, one on each side of each of said flaps.

3. The seat cover of claim 2, wherein said two zippers of each of said flaps are connected together by way of a connecting member to allow said zippers on each side of said flaps to be unzipped simultaneously.

4. The seat cover of claim 1, wherein said one or more seat belts are fastened to said shopping cart by way of said one or more safety clasps attached to said extendable platform of said shopping cart.

5. The seat cover of claim 1, wherein said one or more seat belts are attached to the body of said seat cover and is adaptable to buckle one child sitting in the center of the cart seat or 2 children sitting side by side.

6. The seat cover of claim 1, wherein said one or more seat belt are looped through the body of the said seat cover forming puckers that are able to hold one or more clips able to be removably attached to said shopping cart and hold said seat cover in place.

7. The seat cover of claim 6, wherein said closure means comprises a zipper means.

8. The seat cover of claim 1, wherein said container further comprises a strap fixedly attached at each end to said container for ease of carrying.

9. The seat cover of claim 8, wherein said container comprises a tote bag.

10. The seat cover of claim 9, wherein said tote bag is attached to the back side of the seat cover where said one or two children will be sitting and their backs will be resting, and by positioning said tote bag as such additional cushioning and comfort can be provided for said one or two children.

11. The seat cover of claim 9, wherein said seat cover is configured to be removed from said shopping cart, and said right side said left side of said seat cover are configured to be folded into the middle and rolled one or more times, and then the said seat cover is configured to be picked up and by fully inserting a hand into said tote bag and by grabbing and invert pulling the out said tote bag inside out, said tote bag fully envelops said seat cover in its entirety.

12. The Seat cover of claim 11, wherein said tote bag comprises handling means fixedly attached at each end to said tote bag for ease of carrying when said seat cover is positioned inside said tote bag.

13. The seat cover of claim 9, wherein said seat cover is configured to be removed from said shopping cart, and said front side said back side of said seat cover are configured to be folded into the middle, then zipped up creating said tote bag.

14. The seat cover of claim 8, wherein said open end of said container comprises a closure means.

* * * * *